(12) United States Patent
Kerbs

(10) Patent No.: US 8,864,863 B1
(45) Date of Patent: Oct. 21, 2014

(54) THREE-STAGE SEPARATOR FOR A VACUUM WASTE TANK SYSTEM

(75) Inventor: Bradley Jason Kerbs, Salt Lake City, UT (US)

(73) Assignee: Exelis Inc., McLean, VA (US)

( * ) Notice: Subject to any disclaimer, the term of this patent is extended or adjusted under 35 U.S.C. 154(b) by 464 days.

(21) Appl. No.: 13/344,199

(22) Filed: Jan. 5, 2012

Related U.S. Application Data

(60) Provisional application No. 61/528,368, filed on Aug. 29, 2011.

(51) Int. Cl.
*B01D 50/00* (2006.01)

(52) U.S. Cl.
USPC ............. 55/322; 55/315; 55/318; 55/323; 55/319; 55/320; 55/337; 55/428; 55/385.4; 55/467; 55/482; 55/486; 55/487; 55/DIG. 42; 96/188; 96/189; 96/190

(58) Field of Classification Search
CPC ............ B01D 46/521; B01D 46/2411; B01D 39/1623; C04B 41/009; C04B 38/0006
USPC .......... 55/315, 318, 322, 323, 319, 320, 337, 55/428, DIG. 42, 385.4, 467, 482, 486, 55/487; 96/188, 189, 190
See application file for complete search history.

(56) References Cited

U.S. PATENT DOCUMENTS

| | | |
|---|---|---|
| 2,613,715 A | 10/1952 | Francis |
| 2,790,554 A | 4/1957 | Work |
| 2,970,671 A | 2/1961 | Warner |
| 3,269,097 A | 8/1966 | German |
| 3,933,101 A | 1/1976 | Blas |
| 4,063,315 A | 12/1977 | Carolan et al. |
| 4,222,130 A | 9/1980 | Roberts |
| 4,385,912 A | 5/1983 | Parrick et al. |
| 4,478,619 A | 10/1984 | Arends et al. |
| 4,887,936 A | 12/1989 | Christianson et al. |
| 4,929,133 A | 5/1990 | Wiseman |
| 5,026,407 A | 6/1991 | Tobey |
| 5,083,727 A | 1/1992 | Pompei et al. |
| 5,111,626 A | 5/1992 | Fortune |
| 5,234,483 A | 8/1993 | Tertre et al. |
| 5,368,636 A | 11/1994 | Ashton et al. |
| 5,372,710 A | 12/1994 | Frank |
| 5,538,546 A | 7/1996 | Ashton et al. |
| 5,759,242 A | 6/1998 | Smolarek et al. |
| 5,775,641 A | 7/1998 | Goon |
| 5,850,757 A | 12/1998 | Wierenga |
| 5,882,386 A | 3/1999 | McAferty et al. |
| 6,152,160 A | 11/2000 | Bowden et al. |
| 6,206,943 B1 | 3/2001 | Friesen et al. |

(Continued)

*Primary Examiner* — Dung H Bui
(74) *Attorney, Agent, or Firm* — Thorpe North & Western LLP

(57) ABSTRACT

An air and moisture separator for use with a waste tank and a vacuum source has a canister securable to the waste tank and having an inlet couplable to the waste tank and an outlet couplable to the vacuum source. An air flow path extends through the canister and through at least three different stages of air and moisture separation, including: a first air-turning stage coupled to the inlet; and a second stage of mesh or foam coupled to and subsequent to the first air-turning stage in the air flow path. An annular mesh or foam of greater density defines a third stage subsequent to the second stage, and circumscribes at least a majority of a circumferential perimeter of the mesh or foam of the second stage.

20 Claims, 7 Drawing Sheets

(56) References Cited

U.S. PATENT DOCUMENTS

| | | |
|---|---|---|
| 6,986,806 B2 | 1/2006 | Kvietok et al. |
| 7,648,628 B2 | 1/2010 | Hoffjann et al. |
| 7,998,250 B2 | 8/2011 | Pondelick et al. |
| 7,998,251 B2 | 8/2011 | Pondelick et al. |
| 2007/0181745 A1 | 8/2007 | Huber |
| 2007/0240390 A1* | 10/2007 | Becker et al. ............ 55/423 |

* cited by examiner

THREE-STAGE SEPARATOR FOR A VACUUM WASTE TANK SYSTEM

PRIORITY CLAIM/RELATED APPLICATION(S)

Priority is claimed to U.S. Provisional Patent Application Ser. No. 61/528,368, filed Aug. 29, 2011, which is hereby incorporated herein by reference in its entirety.

BACKGROUND

1. Field of the Invention

The present invention relates generally to an air and moisture separator for a vacuum waste tank system.

2. Related Art

As typically know to most travelers, flushing an aircraft toilet results in the waste fluids and solids being "sucked" from the toilet bowl into a tank via a drain pipe. This fundamental process provides a system that is relatively simple, low in weight, and low in odor in comparison to other systems like a re-circulating toilet used in older aircraft. The principles of this system are based on the pressure differential between the cabin pressure inside the aircraft and the lower air pressure outside of the aircraft at flight altitude. When a patron flushes a toilet, a valve opens to the outside air creating a decrease in pressure or "vacuum" on the sewage waste system in comparison to the cabin pressure. This vacuum pulls the waste fluids and solids from the toilet bowl, through a drain line, and into a holding tank. When the aircraft is on the ground or at lower flight altitudes where this differential of pressures is less than optimal, a vacuum blower is used to boost the differential pressure to the necessary level for the waste system to function correctly.

The fundamental parts of this system comprise of a toilet bowl, a drain line to the holding tank, the holding (waste) tank, and air lines connecting the waste tank to the vacuum blower and the atmosphere outside the aircraft. The waste tank is a simple vacuum vessel used to retain the waste fluids and solids flushed down the toilet until the time the aircraft has landed and tank can be drained. The tank contains sensors, waste inlets and diverts, rinse system, drain, and air-water separator.

The sensors detect the level of the waste inside the tank determining how full the tank is. The sensors are mounted at a certain height along the inner face of the tank wall. They function by analyzing the height of the waste fluids and solids and creating an electronic signal. When the tank is full, the sensors will shut down power to the restrooms connected to it.

The waste inlets and diverts connect the drain line from the toilets to the waste tank. The inlets support the waste system in such a way that the vacuum pressure in the tank draws the waste matter from the toilet, through the drain pipe, through the inlets, and into the tank. The diverts work in conjunction with the inlets of the tank and are aligned with the inlets on the inside of the cap. These work to direct the flow of the waste matter that comes into the tank away from the sensors and air-water separator and reduce the splash of waste matter as it enters the tank. The intent of this is to reduce coating the sensor faces with a buildup of waste fluids and solids that can result in the sensors giving a false reading of a full tank and minimize the amount of fluids and solids impacting/clogging the air-water separator.

Rinse systems are installed into the waste tank in which clean water can be sprayed through the rinse system to clean out the inside of the waste tank during servicing. One of the primary aspects of the rinse system is to remove the liquid and solid waste buildup from the face of the sensors in order to ensure the sensors are providing accurate readings of the waste level in the tank.

The air-water separator, which typically sits at the top of the waste tank, connects the tank to air lines that run to the vacuum blower and the exterior of the aircraft. The separator filters out liquid and solid particulates entrained in the airflow which is generated by vacuum from the external pressure differential or the vacuum blower. It does this though the use of baffles and filtering materials which are typically assembled in a replaceable filter canister. One of the shortcomings of current separator designs is that due to most spatial requirements within the aircraft, the air-water separator is typically required to project downwardly into the tank. This in turn reduces the maximum fluid level within the tank thus diminishing the efficiency of the tank.

Secondly, concern exists about fine particulates bypassing the filter mesh, due to its larger pores, and adhering to the walls of piping and equipment downstream of the air-water separator. This can have adverse effects on the vacuum blowers which could result in ultimate failure and lost time and money in maintenance.

Various separators are shown in U.S. Pat. Nos. 6,206,943; 5,026,407; and 7,998,251.

SUMMARY OF THE INVENTION

It has been recognized that it would be advantageous to develop a separator to separate air and moisture, or air from entrained liquids and solids, for a vacuum waste system or tank.

The invention provides an air and moisture separator for use with a waste tank and a vacuum source. The separator has a canister securable to the waste tank and having an inlet couplable to the waste tank and an outlet couplable to the vacuum source. An air flow path extends through the canister and through at least three different stages of air and moisture separation, including: a first air-turning stage coupled to the inlet, and a second stage of mesh or foam coupled to and subsequent to the first air-turning stage in the air flow path. An annular mesh or foam of greater density defines a third stage subsequent to the second stage, and circumscribes at least a majority of a circumferential perimeter of the mesh or foam of the second stage.

In addition, the invention provides an air and moisture separator for use with a waste tank and a vacuum source. The separator has a canister securable to the waste tank and having an inlet couplable to the waste tank and an outlet couplable to the vacuum source. An air flow path extends through the canister and through at least three different stages of air and moisture separation. A mesh or foam is disposed in the air flow path and in a basket in an interior of the canister, defining a second stage. An air-turning stage circumscribes the mesh or foam of the second stage, and defines a first stage. The air-turning stage includes vertical air passages defined between the basket, a housing wall circumscribing and radially spaced-apart from the basket, and a splash guard wall circumscribing and radially spaced-apart from the housing wall. The inlet is formed in a downward facing portion of the splash guard wall. An upward air passage extends from the inlet, between the splash guard and housing walls, to an upper aperture in the housing wall. A downward air passage extends from the upper aperture, between the housing and basket walls, to a bottom opening in the basket. A denser mesh or foam is disposed in the air flow path, and circumscribes the mesh or foam of the second stage, defining a third stage.

Furthermore, the invention provides an air and moisture separator for use with a waste tank and a vacuum source. The separator includes a canister securable to the waste tank and having an inlet couplable to the waste tank and an outlet couplable to the vacuum source. An air flow path extends through the canister and through at least three different stages of air and moisture separation. A basket is disposed in an interior of the canister and in the air flow path and contains a mesh or foam defining a second stage. The basket has an annular basket wall and a bottom basket wall with at least one basket inlet. A lower housing forms a lower portion of the canister and has an annular housing wall circumscribing and spaced-apart from the annular basket wall, defining a downward air passage. The lower housing has a bottom housing wall spaced-apart from the bottom basket wall with a drain off-set with respect to the at least one basket inlet. The annular housing wall has at least one radial aperture in an upper end thereof. A splash guard circumscribes the lower housing and has an annular guard wall circumscribing and spaced-apart from the annular housing wall, defining an upward air passage. The splash guard has a bottom guard wall spaced apart from the bottom housing wall with at least one guard inlet off-set with respect to the drain. The basket, the lower housing and the splash guard define a first stage with air turning passages including the upward air passage extending from the inlet of the splash guard to the radial aperture of the lower housing, and the downward air passage extending from the radial aperture of the lower housing to the basket inlet of the basket. A denser mesh or foam is disposed in the air flow path, and circumscribes an upper portion the mesh or foam of the second stage, defining a third stage. The drain of the lower housing has a vertical lip circumscribing the drain. The guard inlet of the splash guard has a vertical lip circumscribing the guard inlet.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "circumscribe" and "circumscribing" and the like are used broadly herein to refer to extending around or substantially around something in an annular fashion, but not necessarily in a longitudinal fashion. For example, an annular mesh or foam can circumscribe, or extend around or substantially around, a cylinder, but not necessarily extend the length of the cylinder in a longitudinal direction of the cylinder.

The term "air and moisture separation" is used broadly herein to refer to the separation or substantial separation of moisture and entrained solids or particles from the air of an air stream.

DESCRIPTION

Figure 1:
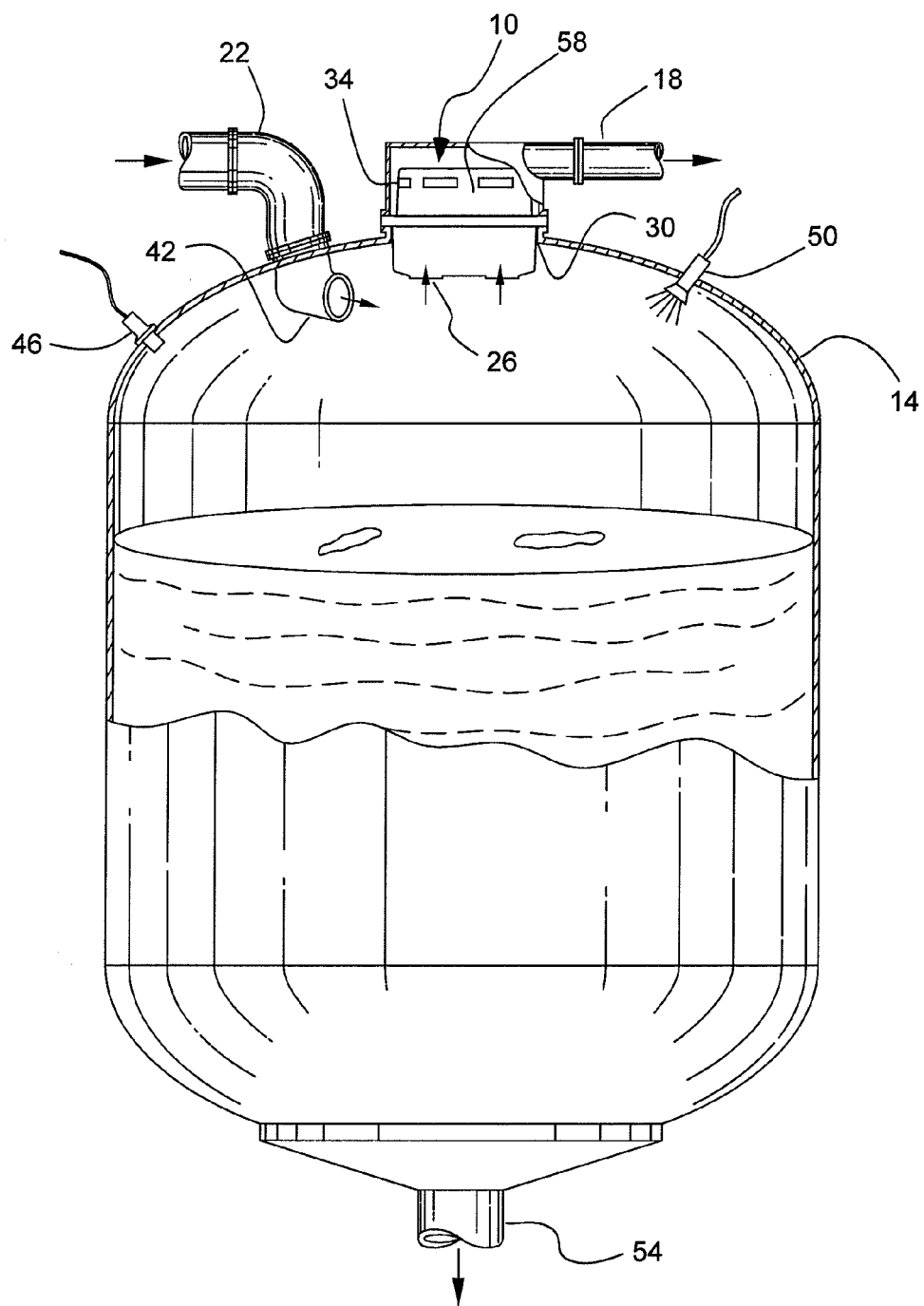
FIG. 1 is a partially broken-away schematic side view of a waste tank with a separator in accordance with an embodiment of the present invention.
Figure 2:
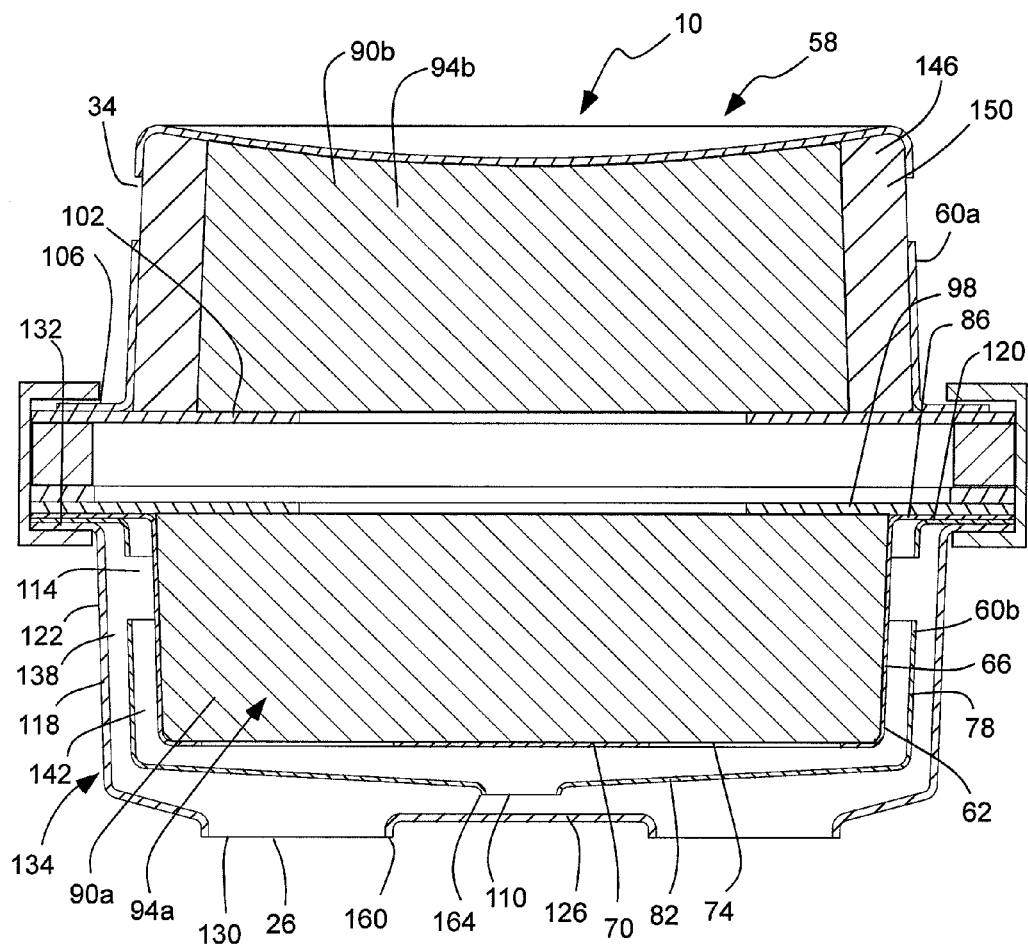
FIG. 2 is a cross-sectional side view of the separator of FIG. 1.
Figure 3:
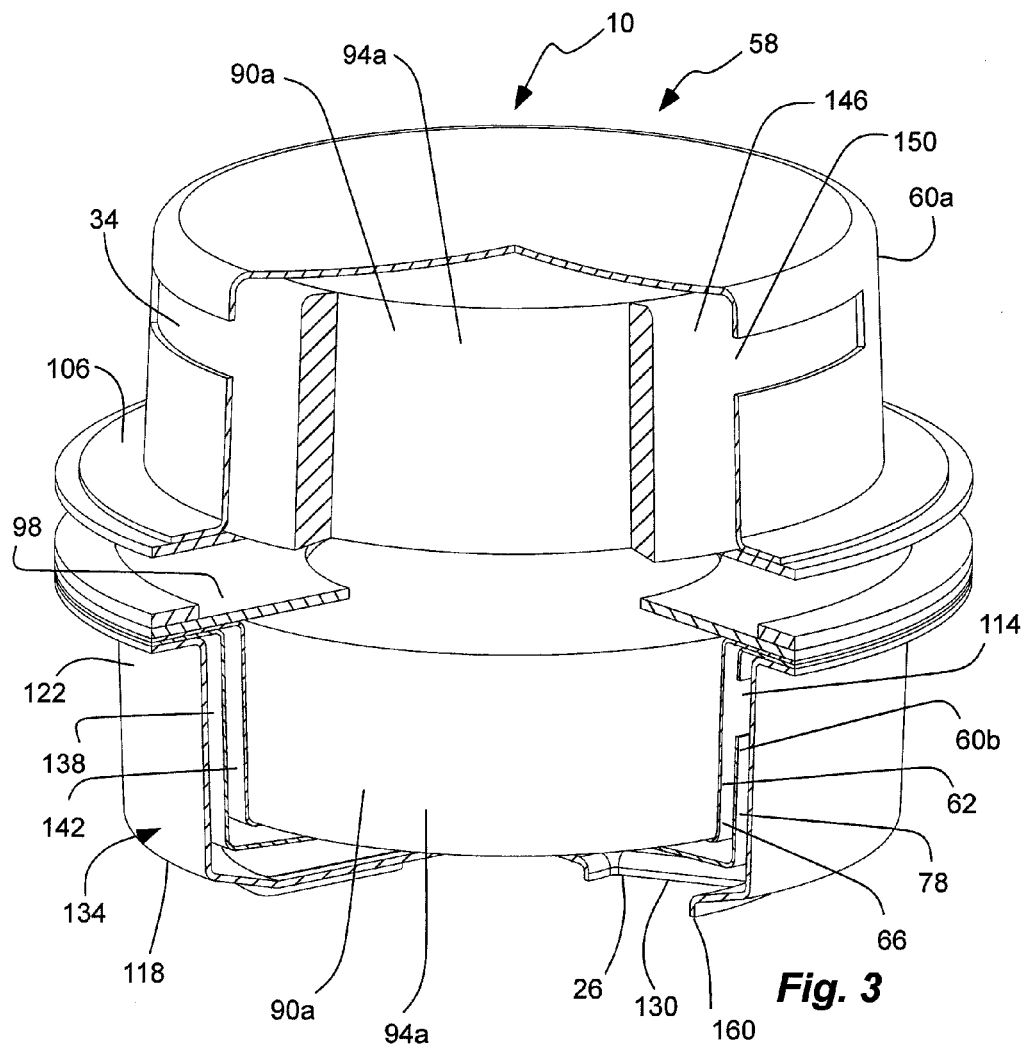
FIG. 3 is a partially broken-away top-side perspective view of the separator of FIG. 1.
Figure 4:
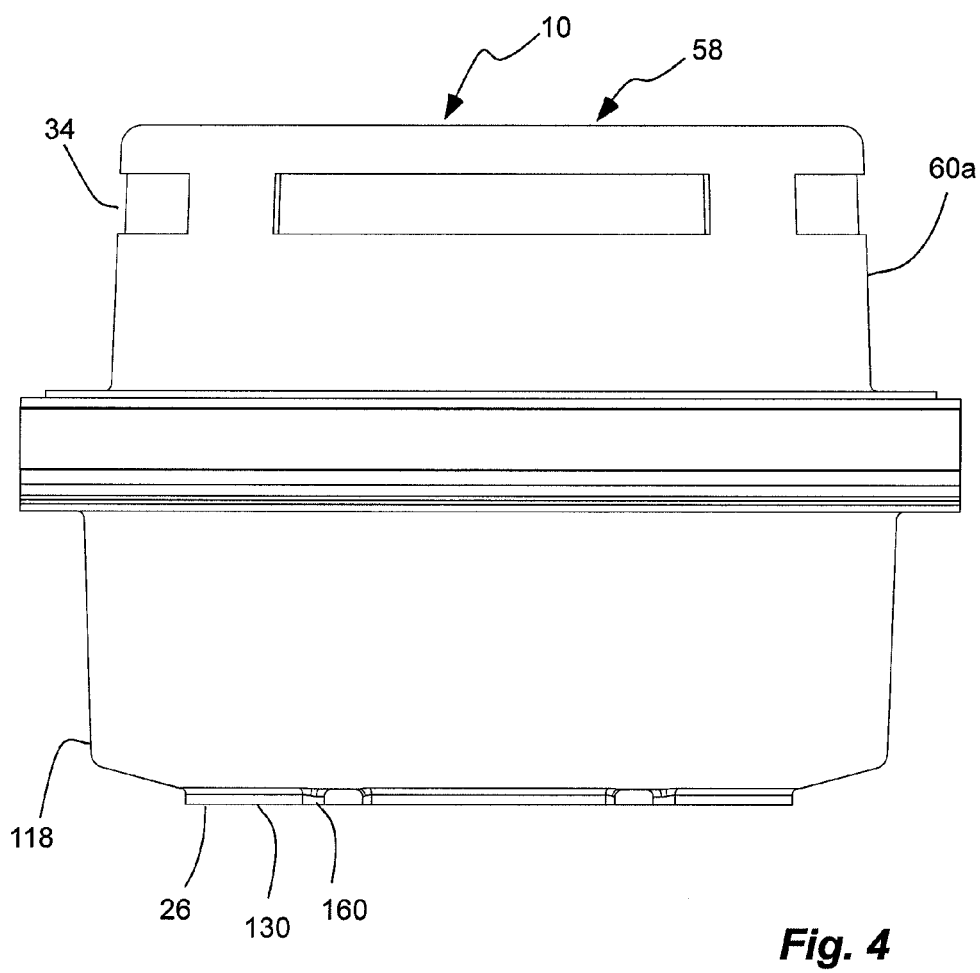
FIG. 4 is a side view of the separator of FIG. 1.

As illustrated in FIGS. 1-10, a separator, indicated generally at 10, in an example implementation in accordance with the invention is shown. The separator 10 can be disposed on a waste tank 14 and coupled between the waste tank 14 and a vacuum source (not shown), such as a blower or lower pressure ambient atmosphere, or piping 18 leading thereto. The waste tank 14 can be coupled to a lavatory (not shown), such as a toilet, or piping 22 leading therefrom. The separator can have an inlet 26 coupled to an outlet 30 of the tank, and an outlet 34 coupled to the vacuum source or piping 18. The waste tank, separator, toilet, vacuum source and piping can form a vacuum waste system, such as for an aircraft. Referring to FIG. 1, a vacuum waste tank system that utilizes the air-water separator 10 can include the vacuum waste tank 14; inlets to the tank, such as piping 22; diverts 42; sensors 46; rinse systems 50; and the separator 10. When a toilet in the main cabin of the aircraft is flushed, the waste flows from the toilet, through the drain line 22, passes through the inlet to the tank, and is distributed into the waste tank 10 by the diverts 42. The waste matter stored in the waste tank 10 is later disposed of through a drain 54 during servicing of the aircraft. The vacuum airflow used to suck the waste through the system is pulled from the tank 14 and through the separator 10. The separator 10 removes liquid and solid waste matter that is entrained in the airflow. The cleaned air then passes through the air line 18 to the vacuum blower and the exterior of the aircraft. Although the waste system and separator thereof are shown and described herein as associated with an aircraft, or as part of an aircraft waste system, it will be appreciated that the separator can also be used with other tanks and waste systems, such as low water consumption commercial or residential toilet systems, or recreational vehicle waste systems.

The separator 10 can separate or substantially separate air and moisture, and/or remove or substantially remove fine particulates from an air stream that might otherwise adhere to the walls of piping and equipment downstream of the separator. In accordance with one aspect, the separator includes at least three different stages, including: a first air-turning stage, a second mesh or foam filter stage, and a third stage of finer mesh or foam that contains smaller pores than the second stage in order to remove the finest particles of waste matter before the airflow leaves the separator. The third stage of finer mesh or foam can surround the second stage and have a greater surface area and/or wider air flow path to increase and/or improve capturing the finest particles. The increased area or flow path can accommodate a finer, denser mesh or foam without unduly restricting the air flow. In addition, the separator can include a configuration and lips around the inlet opening to direct condensation or liquids away from the separator.

Referring again to FIGS. 1-10, the separator 10 includes a housing or canister 58. The canister 58 can be removably secured to the waste tank, and in the outlet 30 of the waste tank. The canister 58 can be disposable and replaceable during use. The inlet 26 of the canister 58 or separator can be coupled to the waste tank 14 or outlet 30 of the waste tank, while the outlet 34 of the canister or separator can be coupled to the vacuum source or air line 18. Thus, an air flow path is defined through the canister 58. As described above, the separator and/or canister can have three different stages of air and moisture separation. The separator or canister can be substantially cylindrical and can be made from many material, including injection molded plastic. The canister 58 can have opposite upper and lower housings 60a and 60b, or housing halves. In addition, the canister can have an annular flange circumscribing the canister. The annular flange can be formed by a pair of opposite canister or housing halves; and can be used to join the halves together. The annular flange can be larger than the outlet 30 of the tank so that the annular flange rests on a perimeter of the outlet of the tank and resists inadvertent falling of the separator or canister into the tank. A clamp can extend around the outlet of the tank (or flange thereof), the annular flange of the separator or canister, and an opening in the air line 18 (or flange thereof) to secure the separator to the tank. The canister can define an interior or chamber.

Figure 8:
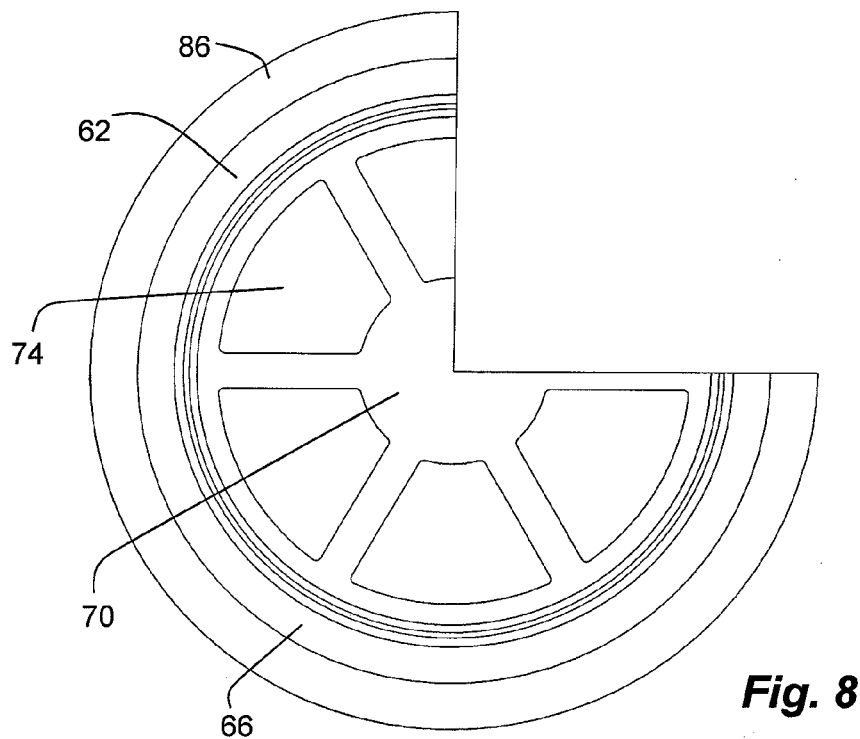
FIG. 8 is a partially broken-away top view of the lower portion of the separator of FIG. 1, showing the basket with the mesh or foam removed.
Figure 9:
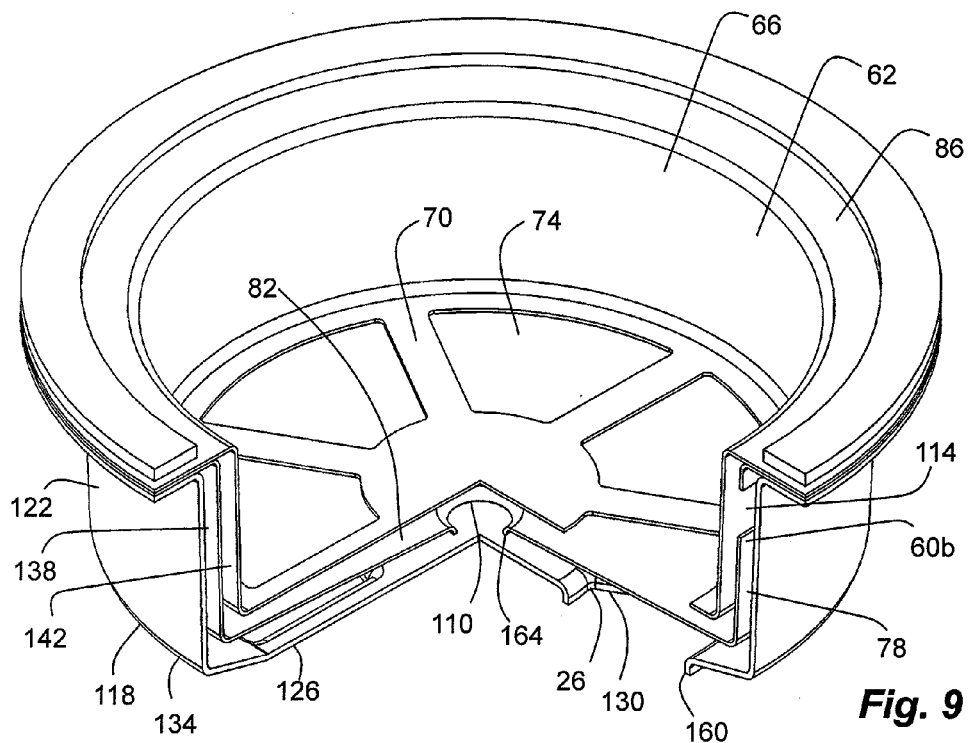
FIG. 9 is a partially broken-away perspective view of the lower portion of the separator of FIG. 1, showing the basket, the lower housing, and the splash guard with the mesh or foam removed.
Figure 10:
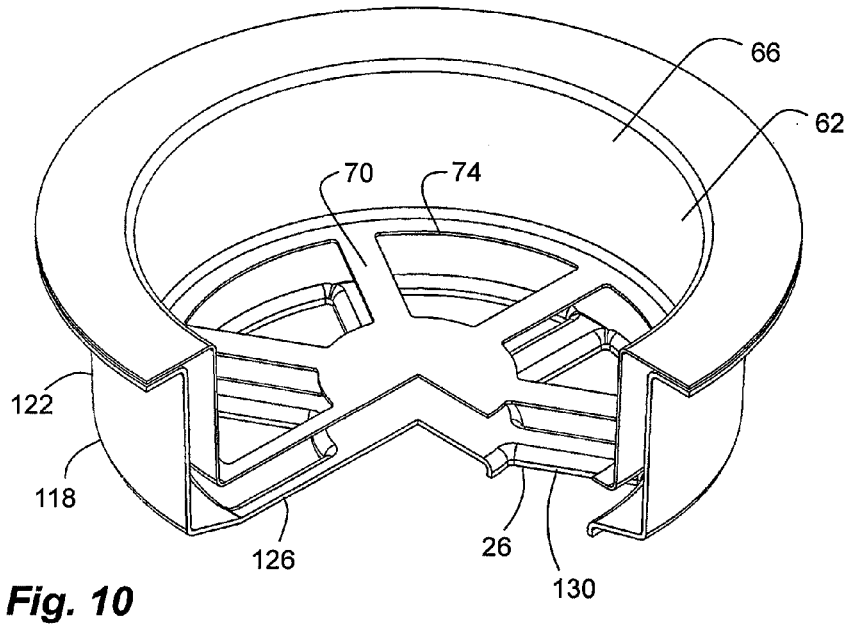
FIG. 10 is a partially broken-away perspective view of the lower portion of the separator of FIG. 1, showing the basket and the splash guard, with the lower housing and the mesh or foam removed.

A basket 62 can be disposed in the interior of the canister, and in the air flow path. The basket 62 can have an annular basket wall 66 and a bottom basket wall 70 with at least one basket inlet 74. The bottom basket wall 70 can be substantially horizontal with a downward facing surface with the basket inlet 74 therein. Thus, the basket inlet 74 can be downward facing. The basket inlet 74 can include several openings spaced around a longitudinal axis of the basket such that a majority of the bottom basket wall is open, as shown in FIGS. 8-10. The basket wall 66 can be solid. The basket 62 can be disposed in the lower housing 60b with the annular basket wall 66 being circumscribed by and spaced-apart from an annular housing wall 78 of the lower housing. The bottom basket wall 70 can be spaced-apart from a bottom housing wall 82 of the lower housing. In addition, the basket 62 can have an upper annular outwardly extending flange 86. The basket 62 contains a mesh or foam 90a that defines a second stage 94a of the separator. The mesh can be a woven polypropylene mesh with a density and or pore size. The foam can be an open cell phone with a density and a pore size. An annular retainer 98 can be disposed over the mesh or foam 90a and over the basket 62 to retain the mesh or foam in the basket. The annular retainer can have a same size or diameter as the flange 86 of the basket.

The upper housing 60a can also have a mesh or foam 90b disposed therein and retained by an annular retailer 102. In one aspect, the mesh or foam 90b of the upper housing 60a can be the same as the mesh or foam 90a of the lower housing 60b or basket 62. Thus, the mesh or foam 90b of the upper housing 60a can also define the second stage 94a. The mesh or foam 90b of the upper housing can be separated from the mesh or foam 90a of the lower housing or basket by a space or gap. The annular retainers 86 and 102 can be separated and can have one or more apertures therein. In another aspect, the mesh or foam 90b of the upper housing 60a can be different from the mesh or foam 90a of the lower housing 60b or basket 62. For example, the mesh or foam 90b of the upper housing can have a greater density or smaller pore size than the mesh or foam 90a of the lower housing. Thus, the mesh or foam 90b of the upper housing 60a can form a different stage, or supplemental stage 94b of the second stage. The upper and lower filter housing are segregated by the filter retainers providing two separate filters working as a set. The upper housing 60a can have a lower annular outwardly extending flange 106. In addition, the outlet 34 of the separator can be formed in the upper housing. The outlet 34 can include a plurality of outlets formed in a lateral side wall of the upper housing 60a and facing radially outwardly. The lateral side wall of the upper housing can be an annular wall. The upper housing can have a top wall with a concave indentation therein to resist movement and bowing outwardly under pressure, and thus retaining the mesh or foam 90b. The upper housing wall can be solid except for the outlets. The top wall of the upper housing can be solid. The upper housing can form an upper portion of the canister.

The lower housing can form a lower portion of the canister. As described above, the lower housing 60b can have an annular housing wall 78 circumscribing and spaced-apart from the annular basket wall 66. A downward air passage can be defined therebetween, as described in greater detail below. The lower housing 60b can have a bottom housing wall 82 spaced-apart from the bottom basket wall 70. The bottom housing wall 82 can have a drain 110 or drain hole. The bottom housing wall 82 can be substantially horizontal with a downward facing surface in which the drain 110 is formed. Thus, the drain 110 can be downward facing. The drain can be centered in the lower housing and aligned with a longitudinal axis of the lower housing or separator. The bottom housing wall 82 of the lower housing can be tapered so that accumulated waste droplets may vacate the lower housing through the drain 110. The drain 110 can be off-set with respect to the at least one basket inlet 74 in a lateral or radial direction, so that the two are not aligned longitudinally or along the longitudinal axis. In addition, the annular housing wall 78 can have at least one radial aperture or upper aperture 114 in an upper end thereof. The lower housing 60b can have an upper annular outwardly extending flange 120. The lower housing wall can be solid except for the radial apertures 114; and the bottom housing wall can be solid except for the drain.

Figure 5:
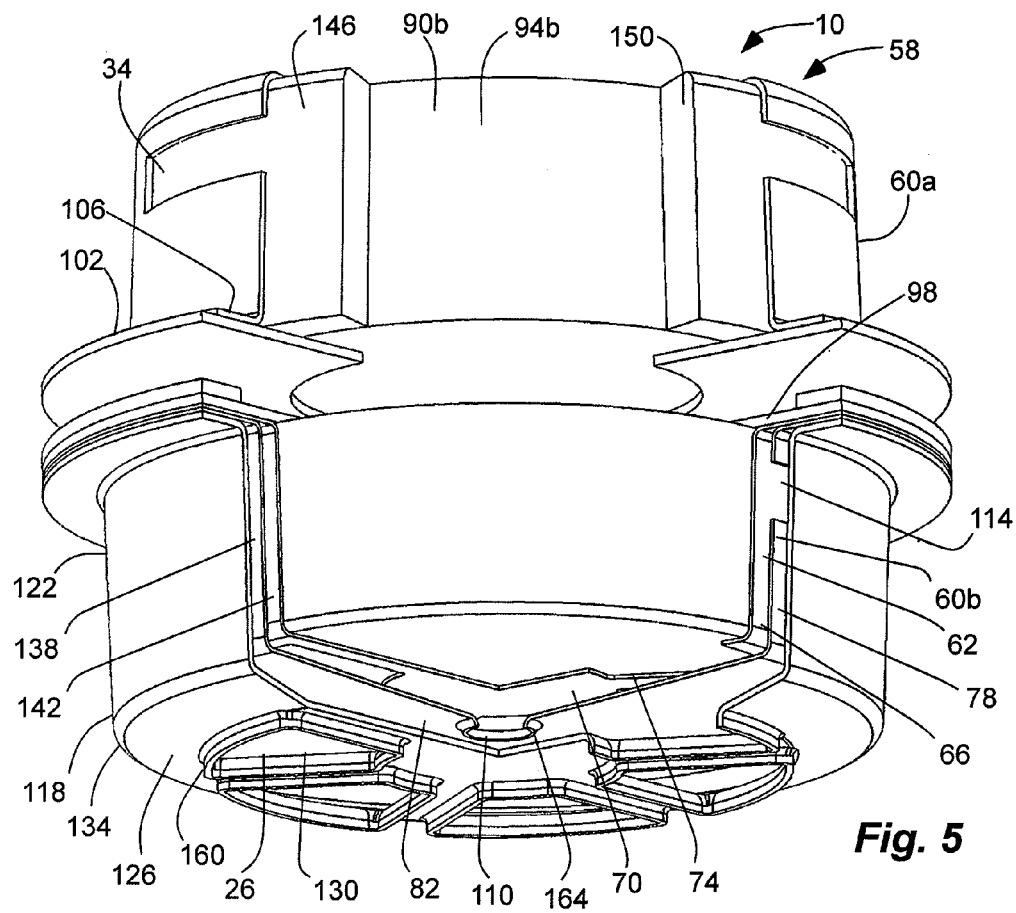
FIG. 5 is a partially broken-away bottom-side perspective view of the separator of FIG. 1.
Figure 6:
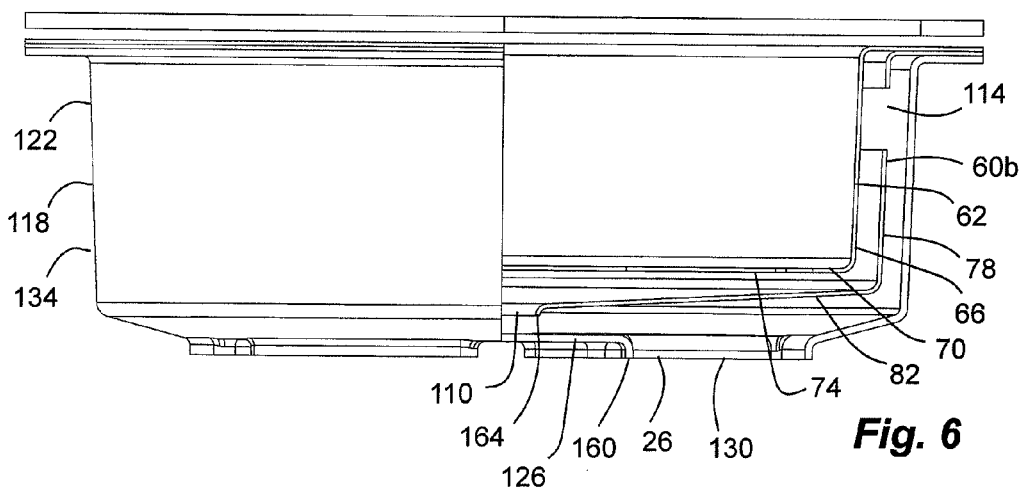
FIG. 6 is a partially broken-away side view of a lower portion of the separator of FIG. 1, showing a basket, a lower housing and a splash guard of the separator with the mesh or foam removed.
Figure 7:
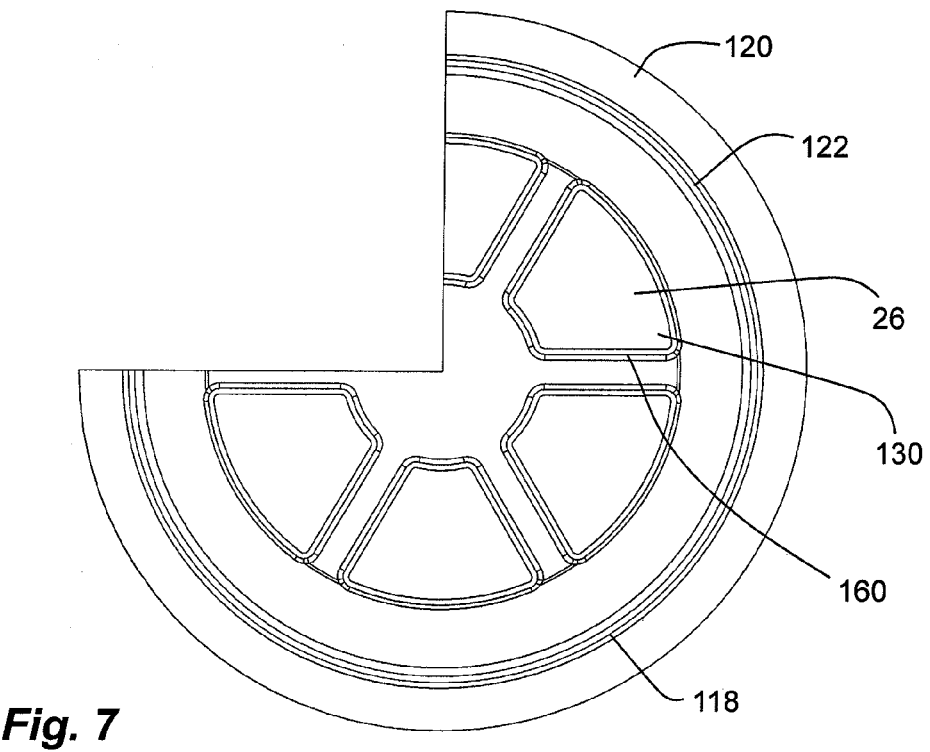
FIG. 7 is a partially broken-away bottom view of the separator of FIG. 1.

A splash guard 118 can circumscribe the lower housing 60b and a lower portion of the canister, and can have an annular guard wall 122 circumscribing and spaced-apart from the annular housing wall 78. An upward air passage can be defined between the two, as described in greater detail below. The splash guard can have a bottom guard wall 126 spaced apart from the bottom housing wall 82. At least one guard inlet 130 can be formed in the bottom guard wall 126, defining the inlet 26 of the separator. The bottom guard wall 126 can be substantially horizontal and downwardly facing so that the guard inlet 130 and separator inlet 26 can face downwardly. The guard inlet 130 and separator inlet 26 can be off-set with respect to the drain 110 in a lateral or radial direction, so that the two are not aligned longitudinally or along the longitudinal axis. The splash guard 118 can include several guard inlets 130 so that the bottom of the splash guard is substantially open, as shown in FIGS. 5 and 7. In addition, the splash guard 118 can have an upper annular outwardly extending flange 132. The guard wall can be solid.

The basket 62, the lower housing 60b and the splash guard 118 can define a first stage 134 that is an air turning stage or cyclone. The second stage 94a (or 94a and 94b) can be subsequent to the first air turning stage 134. The air turning stage can include air turning passages including the upward air passage 138, extending from the inlet 130 of the splash guard 118 to the radial aperture 114 of the lower housing 60b, and the downward air passage 142, extending from the radial aperture of the lower housing to the basket inlet 74 of the basket 62. The upward and downward passages can be 180 degrees with respect to one another. The guard inlets 130 and the basket inlets 74 of the splash guard 118 and the basket 62, respectively, can be circumferentially arrayed around the longitudinal axis, and aligned with one another (as shown in FIG. 10), but separated by the lower housing or bottom housing wall 82 (as shown in FIG. 9). The basket inlet(s) 74 can face the bottom housing wall 82 or inner surface thereof. The drain 110 of the lower housing can face the bottom guard wall 126 or inner surface thereof.

An annular, denser mesh or foam 146 is disposed in the canister, or the upper housing 60a, and in the air flow path. The denser mesh or foam 146 is denser (greater density) and/or has smaller pore sizes than the mesh or foam 90a and 90b of the second stage. The annular, denser mesh or foam defines a third stage 150 subsequent to the second stage. The annular, denser mesh or foam 146 circumscribes at least a majority of a circumferential perimeter of an upper portion the mesh or foam 90a of the second stage 94a (or the mesh or foam 90b). In one aspect, the annular mesh or foam of the third stage forms a complete and continuous annulus. In another aspect, the annular mesh or foam of the third stage forms one or more arcs forming an incomplete and/or discontinuous annulus around a majority of the perimeter of the second stage. The upper outlets 34 of the upper housing 60a facing radially outwardly and the annular mesh or foam of the third stage expands the surface area of the air flow path increasing the efficiency and life of the separator. Thus, the air flow path extends through at least three stages, including a first air turning stage, a second stage of mesh or foam, and a third stage of denser mesh or foam that circumscribes at least a portion of the mesh or foam of the second stage. The third stage is used to filter out the smallest waste matter particulates before the airflow leaves the separator.

The first stage or first air turning stage 134 can circumscribe the mesh or foam 90a of the second stage 94a on a lower portion of the canister or separator. The third stage 150 of denser mesh or foam 146 can circumscribe the mesh or foam 90a (or 90b) of the second stage 94a (or 94b) or an upper portion of the canister or separator. The flanges 86, 120, 132 and 106 of the basket 62, lower housing 60b, splash guard 118 and upper housing 60a can be conjoined and securable to the opening 30 in the waste tank 14. The flanges can be located at approximately a midpoint of the canister, and between the first and third stages, so that only half of the canister or separator extends into the tank.

In addition, the guard inlet(s) 130 of the splash guard and/or separator inlet(s) 26 can have a vertical lip 160 circumscribing the guard inlet 130 or inlet 26. The lip can project or extend vertically downwardly away from the splash guard or bottom guard wall. The lip can reduce splashing into the splash guard, and redirect accumulated droplets away from the upward air passage 138. Similarly, the drain 110 of the lower housing 60b can have a vertical lip 164 circumscribing the drain. Similarly, the lip can project or extend vertically downwardly away from the lower housing or bottom housing wall thereof.

In use, air with entrained waste liquids and solids enters in through the inlet ports 26 and/or 130 of the splash guard 118. The airflow then proceeds through confined passageways 138 between the splash guard 118 and lower housing 60b before entering the lower housing through the radial aperture(s) or upper aperture(s) 114 of the lower housing. The airflow then proceeds through a second set of passageways 142 between the lower housing 60b and the basket 62 before entering the basket through basket inlet(s) 114. Larger particles are removed from the airflow in the first stage 134 of the filtration by increasing the speed of the airflow through the narrow passageways 138 and 142 and inlet ports thus causing the particles to be thrown from the airflow. Furthermore, the waste particles are blocked by the lips 160 and 164 around the inlets 130 of the splash guard 118 and the drain 110 of the lower housing 60b. The airflow enters the second stage 94a (or 94a and 94b) of the filter as it reduces speed through a large chamber of compacted filtration mesh or foam 90a (or 90a and 90b). Smaller waste matter particles adhere to the fine mesh fibers or foam, in a process similar to condensation, as the airflow passes through the mesh chamber. In the case of a second, separate filter chamber, the airflow would pass through the vent holes of the mesh retainers 98 and 102 before proceeding into the mesh or foam 90b of the second filter chamber. In the third stage 150, the airflow exits the mesh or foam 90a (or 90a and 90b) and proceeds through thicker and/or denser layer of mesh or foam 146 before exiting through the outlet ports 34 of the upper filter housing 12b. The denser mesh or foam 146 of the third stage 150 contains smaller pores than the mesh or foam 90a and 90b of the second stage in order to remove the finest particles of waste matter before the airflow leaves the air-water separator.

In addition, a used and/or filled separator can be removed and replaced from the tank.

The above described configuration improves the design of the waste tank system on two bases. The first improvement is a reduction in the size of the air-water separator and a reduction in the clearance needed between the separator and the waste liquid level as compared to current designs. This increases the maximum level of the tank fluids thus increasing the efficiency of the tank. Secondly, the addition of the denser mesh or foam 146 material as a final filtration barrier will reduce to possibility of waste matter particulates bypassing the air-water separator and collecting on downstream piping and equipment.

Although the splash guard, upper and lower housings, and the basked have been described above and shown with cylindrical profiles, it will be appreciated that the splash guard, upper and lower housings, and/or the basket can have conical or domed profiles.

Various aspects of waste systems and separators are described in U.S. Pat. No. 6,206,943, which is herein incorporated by reference.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An air and moisture separator device configured for use with a waste tank and a vacuum source, the device comprising:
   a) a canister securable to the waste tank and having an inlet couplable to the waste tank and an outlet couplable to the vacuum source;
   b) an air flow path through the canister and through at least three different stages of air and moisture separation, including a first air-turning stage coupled to the inlet, and a second stage of mesh or foam coupled to and subsequent to the first air-turning stage in the air flow path; and
   c) an annular mesh or foam of greater density defining a third stage subsequent to the second stage and circumscribing at least a majority of a circumferential perimeter of the mesh or foam of the second stage.

2. A device in accordance with claim 1, further comprising:
   a splash guard circumscribing at least a lower portion of the canister;
   at least one splash guard inlet formed in a bottom downward facing surface of the splash guard; and
   a vertical lip extending from the splash guard and circumscribing the at least one splash guard inlet.

3. A device in accordance with claim 2, further comprising:
   a lower housing of the canister being circumscribed by and radially spaced-apart from the splash guard;
   a drain formed in a bottom downward facing surface of the lower housing, and radially or laterally off-set with respect to the at least one splash guard inlet of the splash guard and facing an inner surface of the splash guard; and
   a vertical lip extending from the lower housing and circumscribing the drain.

4. A device in accordance with claim 3, further comprising:
   a basket disposed in the canister and containing at least a portion of the mesh or foam of the second stage;
   the basket being circumscribed by and radially spaced-apart from the lower housing;
   at least one basket inlet formed in a bottom downward facing surface of the basket; and
   the at least one basket inlet being radially or laterally off-set with respect to the drain of the lower housing and facing an inner surface of the lower housing.

5. A device in accordance with claim 1, further comprising:
   a basket disposed in the canister and containing at least a portion of the mesh or foam of the second stage;
   a lower housing of the canister circumscribing and radially or laterally spaced-apart from the basket;
   a splash guard circumscribing and radially or laterally spaced-apart from the lower housing; and
   the splash guard and the basket each having a downward facing inlet opening.

6. A device in accordance with claim 5, wherein the inlet openings of the splash guard and the basket are separated by a bottom wall of the lower housing.

7. A device in accordance with claim 5, wherein a majority of the bottom of the basket and the splash guard is open.

8. A device in accordance with claim 1, wherein the annular mesh or foam of the third stage circumscribes an upper portion of the canister, while the first air-turning stage circumscribes a lower portion of the canister.

9. A device in accordance with claim 1, wherein the mesh or foam of the second stage includes two separate sections of different mesh or foam.

10. A device in accordance with claim 1, wherein the canister includes:
    a basket containing at least a portion of the mesh or foam of the second stage and having an upper annular outwardly extending flange;
    a lower housing circumscribing the basked and having an upper annular outwardly extending flange;
    a splash guard circumscribing the lower housing and having an upper annular outwardly extending flange; and
    an upper housing containing at least a portion of the mesh or foam of the second stage and the denser mesh or foam of the third stage, and having a lower annular outwardly extending flange; and
    the upper annular outwardly extending flanges of the basket, the lower housing, and the splash guard and the lower annular outwardly extending flange of the upper housing being conjoined and securable to an opening in the waste tank.

11. An air and moisture separator device configured for use with a waste tank and a vacuum source, the device comprising:
    a) a canister securable to the waste tank and having an inlet couplable to the waste tank and an outlet couplable to the vacuum source;
    b) an air flow path through the canister and through at least three different stages of air and moisture separation;
    c) a mesh or foam disposed in the air flow path and in a basket in an interior of the canister defining a second stage;
    d) an air-turning stage circumscribing the mesh or foam of the second stage and defining a first stage, the air-turning stage including vertical air passages defined between the basket, a housing wall circumscribing and radially spaced-apart from the basket, and a splash guard wall circumscribing and radially spaced-apart from the housing wall, the inlet being formed in a downward facing portion of the splash guard wall, an upward air passage extending from the inlet between the splash guard and housing walls to an upper aperture in the housing wall, a downward air passage extending from the upper aperture between the housing and basket walls to a bottom opening in the basket;
    e) a denser annular mesh or foam disposed in the air flow path and circumscribing the mesh or foam of the second stage and defining a third stage.

12. A device in accordance with claim 11, wherein the inlet in the splash guard and the bottom opening in the basket are separated by a bottom wall of the lower housing.

13. A device in accordance with claim 11, wherein a majority of a bottom of the basket and the splash guard is open.

14. A device in accordance with claim 11, wherein the annular mesh or foam of the third stage circumscribes an upper portion of the canister, while the first stage circumscribes a lower portion of the canister.

15. A device in accordance with claim 11, wherein the mesh or foam of the second stage includes two separate sections of different mesh or foam.

16. An air and moisture separator device configured for use with a waste tank and a vacuum source, the device comprising:
    a) a canister securable to the waste tank and having an inlet couplable to the waste tank and an outlet couplable to the vacuum source;
    b) an air flow path through the canister and through at least three different stages of air and moisture separation;
    c) a basket disposed in an interior of the canister and in the air flow path and containing a mesh or foam defining a second stage, the basket having an annular basket wall and a bottom basket wall with at least one basket inlet;

d) a lower housing forming a lower portion of the canister and having an annular housing wall circumscribing and spaced-apart from the annular basket wall defining a downward air passage, the lower housing having a bottom housing wall spaced-apart from the bottom basket wall with a drain off-set with respect to the at least one basket inlet, the annular housing wall having at least one radial aperture in an upper end thereof;

e) a splash guard circumscribing the lower housing and having an annular guard wall circumscribing and spaced-apart from the annular housing wall defining an upward air passage, the splash guard having a bottom guard wall spaced apart from the bottom housing wall with at least one guard inlet off-set with respect to the drain;

f) the basket, the lower housing and the splash guard defining a first stage with air turning passages including the upward air passage extending from the inlet of the splash guard to the radial aperture of the lower housing, and the downward air passage extending from the radial aperture of the lower housing to the basket inlet of the basket;

g) a denser annular mesh or foam disposed in the air flow path and circumscribing an upper portion the mesh or foam of the second stage, and defining a third stage;

h) the drain of the lower housing having a vertical lip circumscribing the drain; and i) the guard inlet of the splash guard having a vertical lip circumscribing the guard inlet.

17. A device in accordance with claim 16, wherein the inlet openings of the splash guard and the basket are separated by a bottom wall of the lower housing.

18. A device in accordance with claim 16, wherein a majority of the bottom of the basket and the splash guard is open.

19. A device in accordance with claim 16, wherein the mesh or foam of the second stage includes two separate sections of different mesh or foam.

20. A device in accordance with claim 16, wherein:
the basket has an upper annular outwardly extending flange;
the lower housing has an upper annular outwardly extending flange;
the splash guard has an upper annular outwardly extending flange; and
the upper housing has a lower annular outwardly extending flange; and
the upper annular outwardly extending flanges of the basket, the lower housing, and the splash guard and the lower annular outwardly extending flange of the upper housing are conjoined and securable to an opening in the waste tank.

* * * * *